United States Patent [19]

Hart

[11] Patent Number: 4,685,615
[45] Date of Patent: Aug. 11, 1987

[54] DIAGNOSTIC THERMOSTAT

[76] Inventor: Douglas R. S. Hart, 97 Six Point Road, Toronto, Ontario, Canada, M8Z 2X3

[21] Appl. No.: 827,716

[22] Filed: Feb. 10, 1986

Related U.S. Application Data

[63] Continuation-in-part of Ser. No. 682,082, Dec. 17, 1984, abandoned.

[51] Int. Cl.⁴ ............................................. G05D 23/00
[52] U.S. Cl. ....................................... 236/94; 165/11.1
[58] Field of Search .............. 236/94, 46 R; 165/11.1; 374/102, 103, 104, 106, 108; 62/125, 126, 127, 129, 130; 364/557, 418, 551

[56] References Cited

U.S. PATENT DOCUMENTS

| | | | |
|---|---|---|---|
| 3,282,105 | 11/1966 | Smith | 374/108 |
| 3,995,686 | 12/1976 | Laube | 236/94 X |
| 4,234,927 | 11/1980 | First | 364/418 X |
| 4,388,692 | 6/1983 | Jones et al. | 236/46 R X |
| 4,460,125 | 7/1984 | Barker et al. | 165/11.1 |

Primary Examiner—Harry Tanner
Attorney, Agent, or Firm—Sim & McBurney

[57] ABSTRACT

A diagnostic thermostat for a building includes an indoor temperature sensor, an outdoor temperature sensor, and a standard arrangement for cycling a furnace on and off in response to the level of the indoor temperature. A time clock is included and the desired indoor temperature can be set. A microprocessor determines, on the basis of various signals, the heating performance of the building over a given period of time, and this heating performance can be displayed.

14 Claims, 4 Drawing Figures

DIAGNOSTIC THERMOSTAT

This is a continuation-in-part application of U.S. patent application Ser. No. 682,082, filed Dec. 17, 1984 (now abandoned).

This invention relates generally to building thermostats, and has to do in particular with a thermostat capable of displaying the thermal efficiency or performance of a building and its heating system, as well as providing the usual controlling functions.

BACKGROUND AND SUMMARY OF THE INVENTION

The general area of devices capable of assessing a heating or cooling system contains several patents of interest.

U.S. Pat. No. 3,417,616, issued Dec. 24, 1968 to W. A. Smith, pertains to such a device. However, the patented device measures the output temperature of the furnace and calculates cumulative BTUs, and therefore measures only the output energy. Thus, a drop in efficiency of the overall system would not be seen. For example, if the furnace efficiency were to drop by 10%, it would have to run 10% longer to achieve the same output BTU. It would be desirable to have a device capable of indicating and taking into account the extended run time, however the device described in U.S. Pat. No. 3,417,616 would show the same output. The patented device also may be inaccurate for two reasons:

1. In order to estimate fuel consumption, it assumes a constant value for furnace efficiency. This assumption is not necessarily valid in all cases.

2. By measuring only the outlet temperature for the heating (or cooling) plant rather than the temperature differential between supply and return, it does not account for changes in the return temperature which will arise due to planned seasonal temperature setbacks, or due to variances in heat delivered to the building for the same supply temperature. It assumes a constant return temperature. The system described in this patent would be suitable only with steam, where heat is delivered by condensation and the return temperature is constant (or irrelevant since heat is transferred by latent heat rather than sensible heat).

Another patent of interest is U.S. Pat. No. 4,234,927, issued Nov. 18, 1980 to T. C. First, which "indicates" degree days by sensing the temperature in individual apartment units. The purpose of the monitoring system described by First is not clear and no means of efficiency measurement is presented in this patent. It is not possible to measure degree days and apartment energy efficiency without measuring outside temperature, and this measurement is not suggested in the First patent. It is presumed that the purpose of the device described is for measurement of apartment energy consumption and the performance of heating system only, and not the efficiency of the individual apartments themselves.

In view of the shortcomings of the prior art as discussed above, it would be desirable to provide a device which was capable of measuring degree days directly, and comparing this to an accumulated run time for the furnace or other heating plant, since this could generate an index which would demonstrate both the changes in the building efficiency, and the efficiency of the heating system itself.

Accordingly, it is an aim of one aspect of this invention to provide a diagnostic thermostat which combines the foregoing monitoring capabilities with the normal function of a thermostat. Because the thermostat is already controlling the heating plant, part of the computation or sensing mechanism required is already present and supplied by the thermostat function.

Likewise the previously described patent to First, U.S. Pat. No. 4,234,927, and another U.S. Pat. No. 4,388,692 to Jones, the preferred embodiment of the present invention utilizes a microprocessor.

Certain further considerations need to be explained before describing the present invention in detail.

(A) Firstly, because of the transient effects due to building thermal capacitance and weather variables such as wind or solar access, any system comparing energy consumption with degree days will be inaccurate except over long time periods (i.e. the heating season) or for exceptional steady state weather conditions. Serious errors, up to 25%, can be introduced into the value of any short-term feedback mechanism that indicates energy efficiency. Since short-term performance information is of major interest in controlling system efficiency, this problem can seriously limit product usefulness and marketability.

(B) Another consideration has to do with the degree of sophistication of a system. Any system which provides information in terms of degree days, or building heat loss coefficient, will find its marketability to the general public quite limited, due to the fact that most people are not familiar with these terms. In addition, each building has different furnace and heating characteristics, and this will make the data generated difficult to understand for the average consumer, and impossible to compare with that of his next door neighbour.

Many currently available electronic thermostats suffer from what is called ergonomic complexity. The number of buttons and functions make them difficult for the average consumer to learn without extensive study. Many consumers and tradespeople have expressed frustration with current thermostat designs.

(C) Lastly, many of the currently available devices for indicating building efficiency are expensive and beyond the technical and economic means of the general consumer.

In regard to the consideration listed above under (A), in a preferred embodiment the present invention constitutes a simple means of providing reliable short-term data indicating energy efficiency. The transient effects due to building capacitance and weather are eliminated by selecting only significant data below a given outside temperature average. Further, the data are averaged over a two-week sampling period to eliminate weather transient effects. They are then normalized by comparison with a baseline performance value for the building stored in the microprocessor. The normalized data can then be presented in the form of a percent or 'energy index' which can be easily understood by the consumer.

To address the complexity of user interaction described under (B), in a preferred embodiment of the present invention the thermostat itself has been designed, using a masking means, to prioritize user interaction according to the level of sophistication. A door can be closed in such a way that only certain program buttons are accessible through the opening provided. These are the buttons used to override the temperature on a temporary basis, and can be operated without any knowledge of further programming. The closed door also shows only the relevant parts of the LCD display needed for this simple level of consumer interaction.

This arrangement is particularly appropriate for babysitters or house occupants who need a simple means of temporary temperature control.

With the door open, the full programming capabilities of the unit are available.

The thermostat can be designed to present the information on a large menu-driven LCD display which allows easy use without user training. Periods of high and low energy consumption can be presented as a bar graph on the display for quick reference.

A further advantage of this diagnostic thermostat/energy monitoring system is that it is low in cost and can be offered to the user at a price comparable to other thermostats now on the market.

In this way, the present invention in a preferred embodiment presents four major advantages over the current art:

1. Through careful data selection, it eliminates the effects of building capacitance and weather transients which would otherwise introduce large errors into the performance data.

2. Through the presentation of the data in the form of a normalized 'energy index' on a menu-driven display, the information is readily understood by the average consumer.

3. By the design of the door, keypad and display, the preferred embodiment of the thermostat prioritizes its operations from an ergonomic point of view. This greatly simplifies the problem of user interaction.

4. The present invention is much lower in cost then other systems, being about the same price as a contemporary thermostat.

GENERAL DESCRIPTION OF THIS INVENTION

More particularly, this invention provides a diagnostic thermostat for a building, comprising:
  first means for sensing indoor temperature,
  second means for sensing outdoor temperature,
  third means for cycling a furnace on and off in response to the level of the indoor temperature,
  fourth means for measuring time,
  fifth means for setting a desired indoor temperature,
  microprocessor means for determining, on the basis of signals from the first, second, third and fourth means, the heating performance of the building over a given period of time, and
  sixth means for displaying the said heating performance.

Furthermore, this invention provides a method of diagnosing the heating performance of a building which includes a furnace, comprising the steps:
(a) sensing indoor temperature and providing a first signal based thereon,
(b) sensing outdoor temperature and providing a second signal based thereon,
(c) cycling the furnace on and off in response to the level of the indoor temperature as compared to a desired indoor temperature,
(d) measuring time, and
(e) on the basis of said time measurement, said first and second signals and the on and off signals, determining electronically the heating performance of the building over a given period of time.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 3:
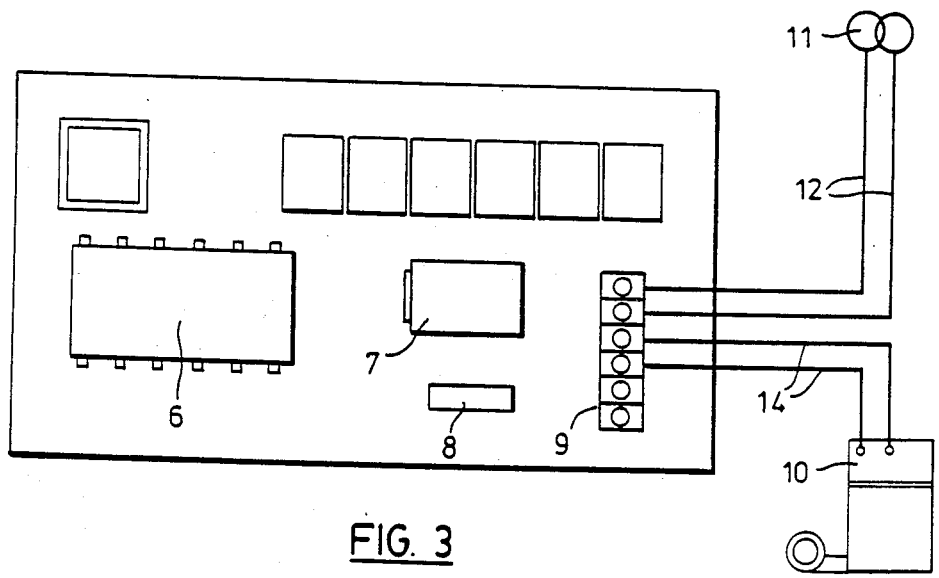
FIG. 3 shows in schematic form the basic components of the diagnostic thermostat and the connection to both the furnace and an outside temperature sensor.

The thermostat shown in the figures, particularly in FIG. 3, incorporates a microprocessor 6 which utilizes a digital display to show several pieces of information, selectable by the operator. The unit also incorporates an electronic clock 7.

In addition to sensing inside temperature directly at the thermostat itself and controlling the heating system in the normal way, the thermostat senses outside temperature by virtue of an outside temperature probe 11 and wires 12 connecting the probe 11 to the thermostat shown in FIG. 3. By accumulating degree days and run time of the heating or cooling plant, the thermostat can calculate, store and display energy used per degree day for a given period of elapsed time. This information represents the performance or efficiency of the building and its heating system. Naturally, any other units may also be employed.

For example, the thermostat could express the average building performance in BTUs per degree day over the previous two week period, two months, or even a year. It could also express this information in terms of energy savings or in terms of a percent reduction from an initial standard energy consumption rate. The data would be accumulated in the memory of the microprocessor, and displayed upon command on the digital display. In FIG. 3, an indoor temperature sensor 8 is illustrated, along with a wiring terminal 9. The wiring terminal 9 also allows the connection of the control wires 14 going to the furnace 10.

One important advantage of the diagnostic thermostat disclosed herein is that improvements in the building or its heating system would become immediately visible in terms of the building efficiency. For example, improved sealing of doors and windows or building insulation would show up as an immediate improvement in building efficiency, i.e. less BTUs per degree day over a given period. Similarly, a decrease in furnace efficiency, such as would occur with a clogged filter or combustion jet, would show up as a decrease in building efficiency, i.e. more BTUs per degree day.

Without a device of this kind, these effects would become visible only by comparing fuel bills over an extended time, for example for two separate years. However, such information would be clouded by variations in fuel costs and the varying severity of the winter months.

In the case of a small commercial building or church for example, a 10% decrease in boiler efficiency could go unnoticed for several years and result in many thousands of dollars wasted. The present thermostat could show this effect within weeks.

Figure 1:
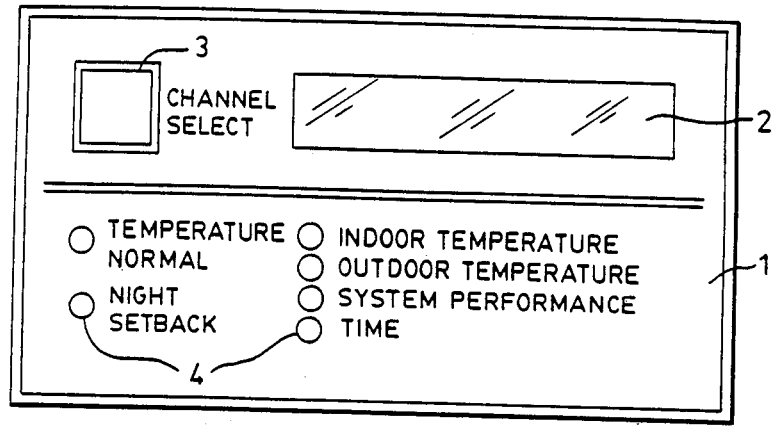
FIG. 1 is an elevational view of a front panel of a diagnostic thermostat, showing the basic display functions.

In FIG. 1, the front panel 1 includes a digital display 2 that can show the indoor temperature or any of the 5 functions indicated. The channels are selected by the user pressing the select button 3, and the particular function being displayed is indicated by the appropriate LED indicator 4.

Figure 2:
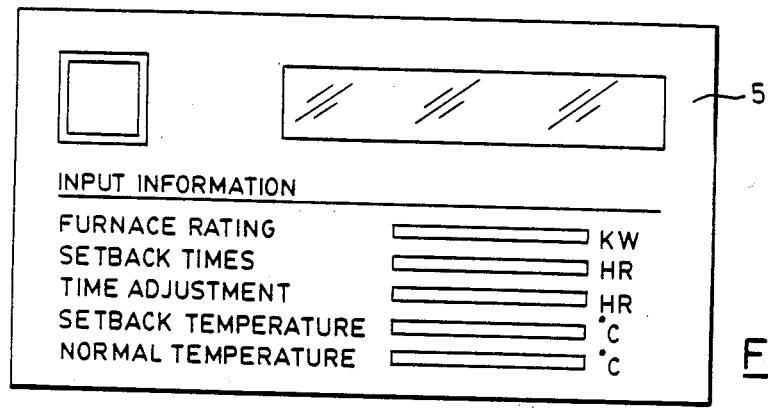
FIG. 2 illustrates an inner panel accessed by lifting or removing the front panel, the inner panel allowing the inputting of fixed data.

On the inner panel 5 shown in FIG. 2, the installer or homeowner can program in fixed data such as the furnace rating (in BTU/hr or KW) and the night setback information.

Several other options could also be incorporated into the thermostat disclosed herein. The system as it is would illustrate the effects of passive solar heating as an improvement in performance on sunny days. Alternatively, the thermostat could be adapted to monitor solar gain directly via a small window-mounted solar sensor. The microprocessor could easily be programmed to set back temperatures at night to a level determined by the operator.

The system could also be used for monitoring the efficiency of cooling systems, or both heating and cooling systems together.

It is also contemplated that the thermostat microprocessor could be used to compute and display other environmental information, such as humidity or air pollutants (indoor or outdoor), using the appropriate sensors. A further function could be to predict the weather by means of measuring such variables as temperatures, humidities or their rates of change, then processing this information by means of software stored in the microprocessor.

It is further contemplated that the microprocessor could be used to store indoor or outdoor temperature records over the past period, for the information of the operator. For example, it could display the maximum and minimum outdoor temperature for the past 24 hr. period. It is additionally contemplated that the energy savings could be displayed as an 'energy consumption index' which would set itself to 100% during the first month of cold weather operation, and thereafter show a number proportional to the increase or decrease in energy consumption. For example, if a user insulated the building and reduced his index to 83%, this means he would save approximately 17% on his fuel bills.

Note that in order to determine an accurate performance evaluation, the thermostat would be required to take average data over a period of time (for example one or two weeks), in order to eliminate short-term transient effects in the weather and building heating system.

It is contemplated to arrange the thermostat such that it would not make a computation of heating efficiency at times when the outside temperature was greater than a certain predetermined level. This will further tend to eliminate transient effects which arise when only a marginal amount of heat is required to maintain the building interior at room temperature.

It is to be understood that the energy savings could be expressed in terms of BTU, KWH or dollars saved over a period of time. This would require the input of user information such as furnace rating or fuel price via the thermostat keypad.

Figure 4:
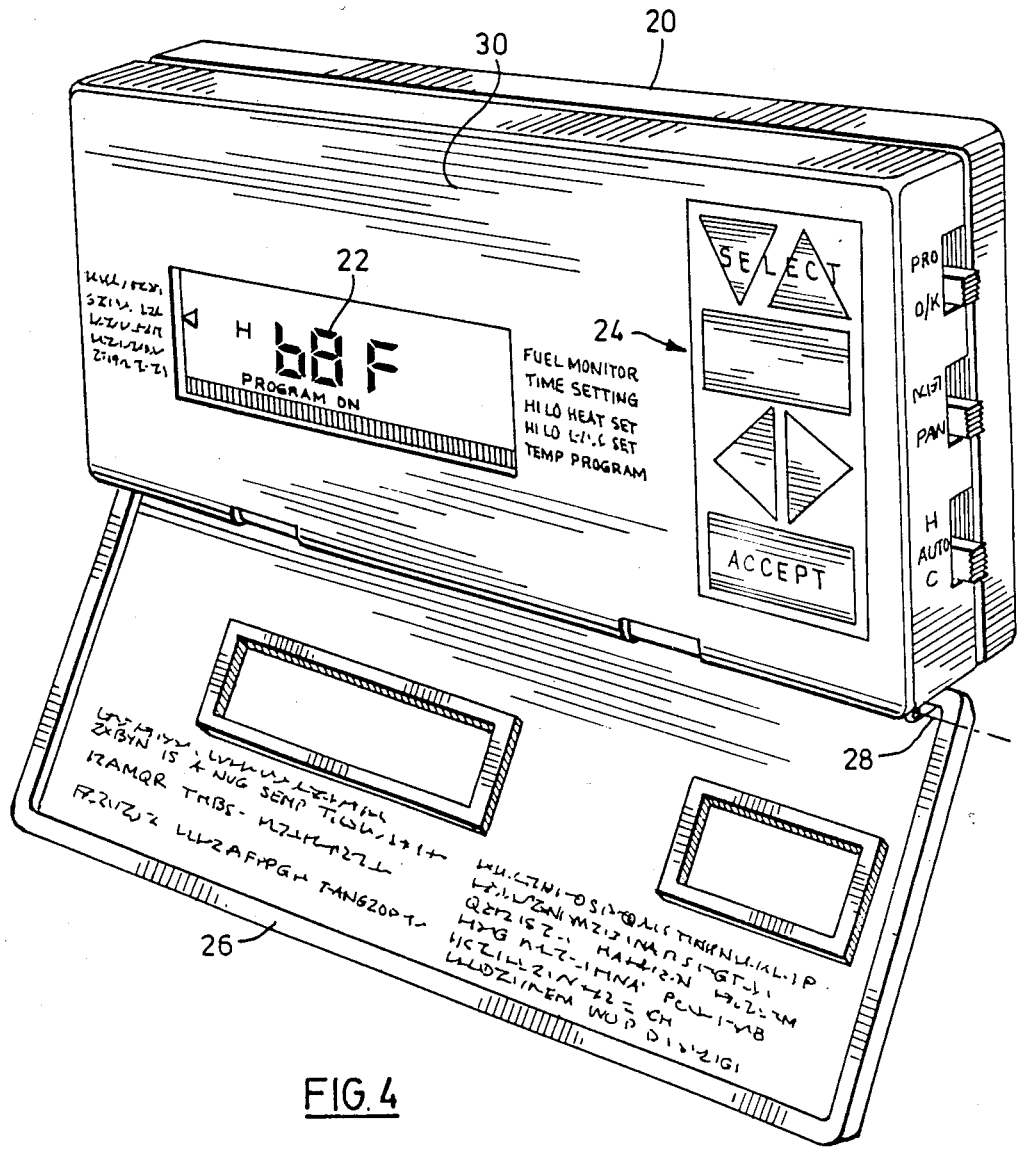
FIG. 4 is a perspective view of a preferred embodiment of the thermostat of this invention, showing a masking door as part of the design.

Referring to FIG. 4, a preferred embodiment of the thermostat is shown at 20, having a digital display 22, and an input pad 24. A door 26 hinged at the line 28 is adapted to close over the forward face 30 of the thermostat 20, thus restricting access to a limited portion of the display 22 and a limited portion of the keypad 24. In this manner, operation of the thermostat could be restricted to a simple lowering or raising of the indoor temperature, without the user being able to access the other functions of the thermostat. This would be particularly suitable when the thermostat is to be operated by a babysitter, or other persons who are not trained in the use of all functions of the thermostat.

While one embodiment of this invention has been illustrated in the accompanying drawings and described hereinabove, it will be evident to those skilled in the art that changes and modifications may be made therein without departing from the essence of this invention, as set forth in the appended claims.

The following pages contain the program documentation, ROM and RAM usage, data and program structures, flow code, and the internal program used in a preferred embodiment of this thermostat.

Program documenation

1.I/O pin usage

| I/O pin# | Function |
| --- | --- |
| D0 | Keypad input - Select Up key, active low |
| D1 | Keypad input - Select down key, active low |
| D2 | Keypad input - Increment key, active low |
| D3 | Keypad input - Decrement key, active low |
| D4 | Keypad input - Accept key, active low |
| D5 | Keypad input - Program key, active low |
| D6 | Indoor temperature input, 50% duty cycle, f=1.4RC |
| D7 | Low battery input, 0-low battery, 1-battery OK |
| D8 | Outdoor temperature input, 50% duty cycle, f=1.4RC |
| D9 | F/C switch, 0-F, 1-C |
| D10 | spare |
| D11 | Low battery test output, 0- test, 1-no test |
| D12 | spare |
| D13 | spare |

| | |
|---|---|
| D14 | Real time clock oscillator |
| D15 | Real time clock oscillator |
| R00 | spare |
| R01 | Program off switch, 0-Program off, 1-Program on |
| R02 | spare |
| R03 | spare |
| R10 | Heat mode input, 0-Heat mode on |
| R11 | Cool mode input, 0-Cool mode on |
| R12 | Auto mode input, 0-Auto mode on |
| R13 | spare |
| R20 | Cooling anticipation 0-1 Degree F, 1-1/2 Degree F |
| R21 | Heating anticipation 0-1 Degree F, 1-1/2 Degree F |
| R22 | Dead band bit 0 |
| R23 | Dead band bit 1, 00-1 Deg F, 01 2 Deg F, 10 3 Deg F, 11 4 Deg F. |
| R30 | Cooling system control, 0-on, 1-off |
| R31 | Heating system control, 1-on, 0-off |
| R32 | spare |
| R33 | spare |
| 2.LCD | display memory assignment |

| Digits | File 0 | | | | File 1 | | | |
|---|---|---|---|---|---|---|---|---|
| | b0 | b1 | b2 | b3 | b0 | b1 | b2 | b3 |
| 0 | M | B47 | B16 | B15 | nu | nu | nu | nu |
| 1 | X0 | B46 | B17 | B14 | nu | nu | nu | nu |
| 2 | X1 | B45 | B18 | B13 | 5F | 5G | 5E | 5D |
| 3 | X2 | B44 | B19 | B12 | 5A | 5B | 5C | nu |
| 4 | X3 | B43 | B20 | B11 | 4F | 4G | 4E | 4D |
| 5 | X4 | B42 | B21 | B10 | 4A | 4B | 4C | : |
| 6 | X5 | B41 | B22 | B9 | 3F | 3G | 3E | 3D |
| 7 | nu | B40 | B23 | B8 | 3A | 3B | 3C | nu |
| 8 | nu | B39 | B24 | B7 | 2F | 2G | 2E | 2D |
| 9 | - | B38 | B25 | B6 | 2A | 2B | 2C | nu |
| 10 | X10 | B37 | B26 | B5 | 1F | 1G | 1E | 1D |
| 11 | X9 | B36 | B27 | B4 | 1A | 1B | 1C | nu |
| 12 | X8 | B35 | B28 | B3 | SUN | WED | THR | nu |
| 13 | X7 | B34 | B29 | B2 | MON | TUE | FRI | SAT |
| 14 | X6 | B33 | B30 | B1 | COOL | PROG | OFF | nu |
| 15 | - | B32 | B31 | B0 | HEAT | ON | L.B. | nu |

Notes:
1. B0-B48 are the 48 bar graph segments with B0 at the left of the display.
2. nu means NOT USED
3. X0-X10 correspond to the user state indicators starting at the upper left corner of the display, moving through to the lower right corner of the display. the table below identifies which user states are associated with which Xi.

| User state# | Xi |
|---|---|
| 0 | X1 |
| 1 | X2 |
| 2 | X3 |
| 3 | X4 |
| 4 | X6 |
| 5 | X7 |
| 6 | X8 |
| 7 | X9 |
| 8 | X10 |

4. L.B. refers to the LOW BATTERY message
5. PROG. refers to the PROGRAM message
6. The day of week, and numerical data are set in RAm using the Pattern instruction. Two pattern tables are set up in Bank 1, which contain the bit patterns to be loaded into display RAM. These table are defined below:
7. The menu indicator is set by setting the least significant bit of the associated memory variable.
8. The bar code bits are set by setting the appropriate bit in each associated nibble.

Day of week ROM pattern

| Bank | Page | address | Pattern for | Hex pattern |
|---|---|---|---|---|
| 1 | 30 | 00 | Sunday | |
| 1 | 30 | 01 | monday | |
| 1 | 30 | 02 | tuesday | |
| 1 | 30 | 03 | wednesday | |
| 1 | 30 | 04 | thursday | |
| 1 | 30 | 05 | friday | |
| 1 | 30 | 06 | saturday | |
| 1 | 30 | 07 | all | |

Numeric data ROM patterns

| Bank | Page | address | Pattern for | Hex pattern |
|---|---|---|---|---|
| 1 | 30 | 10 | 0 | |
| 1 | 30 | 11 | 1 | |
| 1 | 30 | 12 | 2 | |
| 1 | 30 | 13 | 3 | |
| 1 | 30 | 14 | 4 | |
| 1 | 30 | 15 | 5 | |
| 1 | 30 | 16 | 6 | |
| 1 | 30 | 17 | 7 | |
| 1 | 30 | 18 | 8 | |
| 1 | 30 | 19 | 9 | |
| 1 | 30 | 1A | A | |

| | | | |
|---|---|---|---|
| 1 | 30 | 1B | P |
| 1 | 30 | 1C | F |
| 1 | 30 | 1D | C |
| 1 | 30 | 1E | - |

3. RAM usage

| Variable | File | Digit | Comments |
|---|---|---|---|
| HSCHD1 | 2 | 0-8 | First heating time schedule |
| HSCHD2 | 3 | 0-8 | Second heating time schedule |
| HSCHD3 | 4 | 0-8 | Third heating time schedule |
| HSCHD4 | 5 | 0-8 | Fourth heating time schedule |
| CSCHD1 | 6 | 0-8 | First cooling time schedule |
| CSCHD2 | 7 | 0-8 | Second cooling time schedule |
| CSCHD3 | 8 | 0-8 | Third cooling time schedule |
| CSCHD4 | 9 | 0-8 | Fourth cooling time schedule |
| HON | 2 | 9-14 | Daily heating system on time in minutes |
| CSEQU | 2 | 15 | Control sequence flag |
| DDB | 3 | 9-14 | Daily degree minutes |
| EINDX | 4 | 9-11 | Raw energy index |
| BINDX | 4 | 12-14 | Raw base energy index |
| BSET | 4 | 15 | Base index indicator 0- calculated 1-not yet calculated |
| CCOMF | 5 | 9-11 | Cooling comfort setting -99 to 99 |
| CSAV | 5 | 12-14 | Cooling energy saving setting -99 to 99 |
| HCOMF | 6 | 9-11 | Heating comfort setting -99 to 99 |
| HSAV | 6 | 12-14 | Heating energy saving setting -99 to 99 |
| CCONST | 7 | 9-13 | Conversion constant * 100, -99.99 to 99.99 |
| COFFSET | 8 | 9-13 | Conversion offset -999 to 999 |
| MODE | 8 | 14 | Current operating mode 0 - heating 1 - cooling |
| PMODE | 8 | 15 | Previous mode |
| RINDEX | 9 | 9-11 | Raw energy index for the current day |
| CURSET | 9 | 12-15 | Current set point in binary units 0 to 999 |
| TICKS | 10 | 0 | 1/4 second ticks |
| SECS | 10 | 1-2 | Seconds 0 to 59 |
| MIN | 10 | 3-4 | Minutes 0 to 59 |
| HOURS | 10 | 5-6 | Hours 0 to 12 |
| HHOUR | 10 | 7-8 | 1/2 hours 0-47 |
| AMPM | 10 | 9 | AM, PM indictor 0-AM, 1-PM |
| DWK | 10 | 10 | Day of week, 1 TO 7 = SUN to SAT |
| PMIN | 10 | 11 | Previous minutes flag |
| SMIN | 10 | 12 | Start of new minute flag, 1-new minute 0-same minute |
| SETUPD | 10 | 13 | Setting update flag, 0-don't update settings, 1-update settings |
| TNUM | 11 | 0 | Transition number |
| PTNUM | 11 | 1 | Previous transition number |
| SCHED | 11 | 2 | Currently active schedule number |
| SETTING | 11 | 3-5 | Current control setting 0-99 |
| Variable | File | Digit | Comments |
| PADNO | 11 | 6 | Keypad most recently pressed 0 - Select up key 1 - select down key 2 - increment key 3 - decrement key |

|          |    |       | 4 - accept key |
|          |    |       | 5 - program key |
|          |    |       | 15 - no key |
| BFLAG    | 11 | 7     | Blink flag, complemented every 1/4 secs |
| BDIGIT   | 11 | 8     | Start digit in file 1 to blink |
| BTYPE    | 11 | 9     | Blink type, 0-no blink |
|          |    |       | 1 - two digit number to blink |
|          |    |       | 2 - transition bar to blink |
| USTAT    | 11 | 10    | User state variable |
| DSET     | 11 | 11    | Value by which to increment or decrement the binary settings for a 1 degree change in engineering units |
| IDTEMP   | 12 | 0-2   | Inside temp in binary |
| ODTEMP   | 12 | 3-5   | Outside temp in binary |
| BDISP    | 12 | 6     | Bar graph to display 0-7 for heating and cooling schedules, 8 for blank graph |
| BDIGIT   | 12 | 7     | Pointer to bar graph display digit 0-15 |
| BBIT     | 12 | 8     | Pointer to bar graph display bit 0-2 These pointers are used during bar graph entry |
| PROG     | 12 | 9     | Program state flag, used to indicate the variable currently being programmed. |
| DDISP    | 12 | 10    | Day of week to display, 1-7 sunday to saturday, 8 all days. |
| TUNIT    | 12 | 11-12 | Temperature units pattern, when loaded to the display, displays F or C. |
| SDAY     | 12 | 13    | Day fo which schedule is to be edited. |
| SDSCHED  | 12 | 14    | Schedule for the selected day. |
| TTIMER   | 12 | 15    | Time out timer, <3 no time out =3 time out has occurred |

4.Math utilities
the program will include a library of math routines, which will operate on 5 nibble numbers and generate 5 nibble results. Numbers will be stored in BCD format with a leading sign nibble. These routines will expect arguments to be found in file 15, and will return results in the same file. The following routines will be implemented:

| Routine Name | Description |
|---|---|
| MULT | This multiplies two 7 nibble signed BCD numbers to generate a 7 nibble signed result. |
| DIV  | This divides two signed 7 nibble BCD numbers to generate a 7 nibble signed result |
| ADD  | This adds two 7 nibble signed BCD numbers to generate a 7 nibble signed result. |
| MOVN | This moves n nibbles from a specified file and digit to a specified file and digit. |
| INCM | This increments a specified variable of specified length, by a specified amount. |

Subtraction will be carried out by adding one negative and one positive number.

All control calculations will be carried out in binary units. Data to be displayed will be converted to engineering units by multiplying by a constant and adding an offset.

All engineering units entered, i.e. set points will be converted to binary units before being stored. Signed BCD notation will be used to store all numbers.

The conversion constants and offsets will be selected by examining the F/C input once a scan, and selecting the appropriate values.

5. Data structures

The system stores 8 operating time schedules. Four are for heating operation, four for cooling.

Each schedule includes 4 transition times and a day variable. Each schedule is defined by its start address. the transition times are stored as half hour counts, with 00:00 corresponding to a count of 0, and 23:30 corresponding to a count of 47. The schedule structure is shown below:

| Nibble# | function |
|---|---|
| 0 | Day variable, 0 not used, 1-7 days of week, 8 all days |
| 1-2 | First transition, from off to on |
| 3-4 | second transition, from on to off |
| 5-6 | third transition, from off to on |
| 7-8 | fourth transition, from on to off |

6. Program structure

The program cosists of a foreground program, and an interrupt program.

The foreground program consists of an endless loop which processes the operator input, and carries out the control strategy.

The interrupt program keeps time, checks for keypad activity, and reads the inside and outside temperatures.

The LCD IV processor allows only 4 levels of nesting, because of this, the interrupt routine will be run without calling any subroutines, the foreground program will be able to nest routines to 3 levels of nesting.

The program seuqence is described in the flow code below.

7. Flow code 7.1 Initialization

```
BEGIN INITIALIZATION
    SET REGISTER R4 FOR: NO LCD EXTENSION, 1/4 DUTY RATIO
    SET REGISTER R5 FOR: 1/3 BIAS, LCD RAM IN FILES 0 AND 1
    SET REGISTER R6 FOR: NO LCD BLANKING
    SET D0-D9 OUTPUT HIGH TO ENABLE INPUT SENSING
    SET D11 HIGH TO DISABLE BATTERY TESTING
    SET R1 OUTPUT HIGH TO ENABLE INPUT SENSING
    SET R2 OUTPUT HIGH TO ENABLE INPUT SENSING
    SET R30 HIGH TO SET THE COOLING CONTROL OFF
    SET R31 LOW TO SET THE HEATING CONTROL OFF
    CLEAR ALL OF RAM
    LOAD DEFAULT TIME SCHEDULES INTO RAM
    LOAD TIMER WITH 12 FOR 4 HZ INTERRUPT FREQUENCY
    RESET CF TO ENABLE TIMER MODE OF OPERATION
    RESET TF TO ENABLE TIMER INTERRUPTS
    ENABLE INTERRUPTS
END INITIALIZATION
```

7.2 Main foreground ~~program~~

```
BEGIN MAIN PROGRAM
    REPEAT FOREVER
        IF CSEQU=0 THEN
            CARRY OUT TIME CHECK
            ESTABLISH MODE, HEATING OR COOLING
        END IF
        IF (SMIN=1 OR SETCHK=1) AND PROG=0 THEN
            CARRY OUT CONTROL
        END IF SMIN
        IF SMIN=1 THEN
            CARRY OUT MONITORING
        END IF SMIN
        INCREMENT SEQUENCE NUMBER
        PROCESS USER INPUTS
    END REPEAT FOREVER
END MAIN PROGRAM

BEGIN TIME CHECK
    IF (MIN <> PMIN) THEN
        SET SMIN TO 1
        STORE MIN IN PMIN
    ELSE
        SET SMIN TO 0
    END IF MIN
END TIME CHECK
BEGIN ESTABLISH MODE
    IF R10 IS 0 THEN
        SET MODE = HEAT (0)
    END IF
    IF R11 IS 0 THEN
        SET MODE = COOL (1)
    END IF
    IF R12 = 0 THEN
        IF MODE = HEAT THEN
            IF CURRENT SETTING > HEATING COMFORT SETTING THEN
                IF INDOOR TEMP > CURRENT SETTING + 2 C THEN
                    SET MODE TO COOL
                END IF INDOOR
            ELSE
                IF INDOOR TEMP > H COMFORT SETTING + 2C THEN
                    SET MODE TO COOL
                END IF INDOOR
            END IF CURRENT SETTING
        END IF MODE
        IF MODE = COOL THEN
            IF CURRENT SETTING < COOLING COMFORT SETTING THEN
                IF INDOOR TEMP < CURRENT SETTING - 2C THEN
                    SET MODE TO HEAT
                END IF INDOOR
            ELSE
                IF INDOOR TEMP < C SETTING - 2C THEN
                    SET MODE TO HEAT
                END IF INDOOR
            END IF CURRENT SETTING
        END IF MODE
    END IF R12 = 0
    IF MODE = HEAT THEN
        DISPLAY HEAT MESSAGE
```

```
        ELSE
             DISPLAY COOL MESSAGE
        END IF MODE
        IF PMODE <> MODE THEN
             SET SETCHCK=1
             SET PMODE=SMODE
        ELSE
             SET SETCHK=0
        END IF
 END ESTABLISH MODE
BEGIN CARRY OUT CONTROL
     IF CONTROL SEQUENCE = 0
          TURN LOW BATTERY TEST CIRCUIT ON (D11=0)
          IF R01 =1 (PROGRAM MODE ON)
               UPDATE CONTROL SETTING
               DISPLAY PROGRAM ON MESSAGE
          ELSE
               DISPLAY PROGRAM OFF MESSAGE
          END IF
          END IF R01
          ON CASE HEATING OR COOLING DO
          BEGIN HEATING
               CARRY OUT HEATING ALGORITHM
          END HEATING
          BEGIN COOLING
               CARRY OUT COOLING ALGORITHM
          END COOLING
          IF LOW BATTERY INPUT IS LOW (D7=0) THEN
               DISPLAY LOW BATTERY MESSAGE
          END IF LOW
     END IF SEQUENCE = 0
END CARRY OUT CONTROL

BEGIN CARRY OUT MONITORING
     IF CONTROL SEQUENCE = 1 THEN
          IF OUTSIDE TEMP < 18C THEN
               UPDATE DAILY DEGREE MINUTES
               UPDATE FURNACE RUN TIME
          END IF
     END IF SEQUENCE = 1
     IF CONTROL SEQUENCE = 2
          UPDATE ENERGY INDEX
     END IF SEQUENCE = 2
     IF CONTROL SEQUENCE = 3
          UPDATE BASE ENERGY INDEX
     END IF SEQUENCE = 3
END CARRY OUT MONITORING
BEGIN SETTING UPDATE
     IF SMIN=1 OR SETCHK=1 THEN
          IF MIN=30 OR MIN=0 OR SETCHK=1 THEN
               UPDATE THE CONTROL SETTING
          END IF
     END IF
END SETTING UPDATE
BEGIN UPDATING THE CONTROL SETTING
     IF MODE=0 THEN
          SELECT HEATING SCHEDULES
     ELSE
          SELECT COOLING SCHEDULES
     END IF
```

```
    FOR THE FIRST 3 SCHEDULES
        IF SCHEDULE DAY = DWK THEN
            SELECT THIS SCHEDULE
            LOAD SCHEDULE FILE# INTO SCHED
        END IF
    END FOR
    IF NO SCHEDULE HAS BEEN SELECTED THEN
        USE SCHEDULE NUMBER 4 (THE EVERY DAY SCHEDULE)
        LOAD SCHEDULE FILE NUMBER INTO SCHED
    END IF
    FOR ALL FOUR TRANSITION TIMES
        IF HHOUR > TRANSITION TIME THEN
            STORE TRANSITION NUMBER TO TNUMB
        END IF
    END FOR
    IF CURRENT TRANSITION NUMBER <> PREVIOUS TRANSITION NUMBER
    (TNUMB <> PTNUMB ) THEN
        PTNUMB=TNUMB
        IF MODE = HEATING THEN
            SELECT HEATING SETTINGS
        ELSE
            SELECT COOLING SETTINGS
        END IF
        IF TNUMB IS EVEN THEN
            LOAD ENERGY SAVING SETTING INTO SETTING
        ELSE
            LOAD COMFORT SETTING INTO SETTING
        END IF
    END IF TRANSITION NUMBER
END UPDATING CONTROL SETTING

BEGIN UPDATE DAILY DEGREE MINUTES
    CALCULATE OUTDOOR TEMP - 18C USING ADD ROUTINE
    DDB RESULT TO DDB USING ADD ROUTINE
END UPDATE DAILY DEGREE MINUTES

BEGIN UPDATE FURNACE RUN TIME
    IF R31 = 1 THEN
        INCREMENT HON BY 1 USING ROUTINE INCM
    END IF
END UPDATE DAILY DEGREE MINUTES
BEGIN UPDATE ENERGY
    IF BSET = 1 THEN
        IF HOURS = 23 AND MIN = 59 THEN
            CALCULATE RESULT1 = HON * 100 / ( 4 MSD OF DDB)
            CALCULATE RESULT2 = 13 * RINDEX
            CALCULATE RESULT3 = RESULT1 + RESULT 2
            CALCULATE REINDEX = RESULT3 / 14
            CALCULATE EINDEX = RINDEX * 100 / BINDEX
            CLEAR DDB
            CLEAR HON
        END IF HOURS
    END IF BSET
END UPDATE ENERGY INDEX

BEGIN CALCULATE BASE ENERGY INDEX
    IF BSET = 0 THEN
```

```
            IF HOURS = 23 AND MIN = 59 THEN
                IF   MSD OF DDB = 9 OR HON > 9000 THEN
                    CALCULATE BINDEX = HON * 100 / ( 4 MSD OF DDB)
                    SET BSET
                    CLEAR DDB
                    CLEAR HON
                END IF MSD
            END IF HOURS
        END IF BSET
END CALCULATE BASE ENERGY INDEX

BEGIN INCREMENT SEQUENCE NUMBER
        INCREMENT CSEQU
        IF CSEQU > 3 THEN
            SET CSEQU=0
        END IF
END INCREMENT SEQUENCE
BEGIN PROCESS USER INPUT
        SET UP TEMPERATURE UNIT VARIABLES
        DISPLAY BAR GRAPH AS INDICATED BY BDISP
        DISPLAY DAY STORED IN DDISP
        IF TTIMER = 3 THEN
            BTYPE = 0
            USTAT = 0
        END IF
        ON CASE STATE = USTAT
            PROCESS STATE
                (DISPLAY STATE   DATA)
                (DISPLAY STATE   INDICATOR)
                (PROCESS STATE   KEYPADS)
        END CASE
CARRY OUT BLINK PROCESSING
END PROCESS USER INPUT

BEGIN SET UP TEMPERATURE UNIT VARIABLES
        IF D9=0 (DEGREE F SELECTED) THEN
            SET DSET FOR DEGREES F
            SET CCONST FOR DEGREES F
            SET COFFSET FOR DEGREES F
            SET TUNIT TO F PATTERN
        ELSE
            SET DSET FOR DEGREES C
            SET CCONST FOR DEGREES C
            SET COFFFSET FOR DEGREES C
            SET TUNIT TO C PATTERN
        END IF
END SET UP TEMPERATURE VARIABLES
BEGIN DISPLAY BAR GRAPH
        SELECT BAR GRAPH WITH FILE STORED IN BDISP
        IF BDISP < 8 THEN
            SET TNUM=0
            SET PTRAN=FIRST TRANSITION TIME
            SET LTRAN=0
            FOR 4 TRANSITION TIMES
                WHILE LTRAN < PTRAN
                    IF LTRAN IS <16 THEN
                        IF TNUM IS EVEN THEN
                            RESET BIT 0 OF DIGIT LTRAN
                        ELSE
                            SET BIT 0 OF DIGIT LTRAN
```

```
                        END IF
                        INCREMENT LTRAN
                END IF < 16
                IF LTRAN IS >15 AND < 32 THEN
                        IF TNUM IS EVEN THEN
                                RESET BIT 1 OF DIGIT =
                                15 - (LSN OF LTRAN)
                        ELSE
                                SET BIT 1 OF DIGIT =
                                15 - (LSN OF LTRAN)
                        END IF
                        INCREMENT LTRAN
                END IF
                IF LTRAN IS > 31 THEN
                        IF TNUM IS EVEN THEN
                                RESET BIT 2 OF DIGIT =
                                ( LSN OF LTRAN)
                        ELSE
                                SET BIT 2 OF DIGIT =
                                (LSN OF LTRAN)
                        END IF
                        INCREMENT LTRAN
                END IF
            END WHILE LTRAN
            INCREMENT TNUM
            STORE THE NEXT TRANSITION IN  PTRAN
        END FOR 4 TRANSITION TIMES
    ELSE (BDISP >=8)
        FOR FILE 0, DIGITS 0-15
            RESET BITS 0, 1, 2
        END FOR
    END IF BDISP<8
END DISPLAY BAR GRAPH

BEGIN DISPLAY DAY STORED IN DDISP
    USE DDISP AS AN INDEX TO RETRIEVE THE APPROPRIATE PATTERNS
    STORE THE PATTERNS IN FILE 1, DIGITS 12 AND 13
END DISPLAY DAY
BEGIN STATE 0 (SETTING)
    SELECT SETTING
    CONVERT SELECTED DATA TO ENGINEERING UNITS
    TRANSFER DATA TO 3RD AND 2ND LSDS OF NUMERIC DISPLAY
    TRANSFER TUNIT TO LSD OF NUMERIC DISPLAY
    BLANK LEADING 3 DIGITS OF NUMERIC DISPLAY
    BLANK ":"
    ACTIVATE STATE 0 INDICATOR
    STORE SCHED IN BDISP
    STORE DWK IN DDISP
    IF INC KEY IS PRESSED THEN
        INCREMENT SETTING BY DSET
        IF SETTING > SETMAX THEN
            SETTING = SETMAX
        END IF
    END IF
    IF DEC KEY IS PRESSED THEN
        DECREMENT SETTING BY DSET
        IF SETTING < SETMIN THEN
            SETTING = SETMIN
        END IF
    END IF DEC
```

```
        IF SELECT DOWN KEY IS PRESSED THEN
             BLANK STATE 0 INDICATOR
             IF PROGRAM MODE IS ON (R01=1) THEN
                  SET USTAT=8
             ELSE
                  USTAT=5
             END IF
        END IF
        IF SELECT UP KEY IS PRESSED THEN
             BLANK STATE 0 INDICATOR
             SET USTAT=1
        END IF
   END CASE USTAT=0
END STATE 0 PROCESSING
BEGIN STATE 1 PROCESSING (INDOOR TEMP)
        SELECT INDOOR TEMP
        CONVERT SELECTED DATA TO ENGINEERING UNITS
        TRANSFER DATA TO 3RD AND 2ND LSDS OF NUMERIC DISPLAY
        BLANK LEADING 2 DIGITS OF NUMERIC DISPLAY
        TRANSFER TUNIT TO LSD OF NUMERIC DISPLAY
        ACTIVATE STATE 1 INDICATOR
        IF SELECT UP KEY IS PRESSED THEN
             BLANK STATE 1 INDICATOR
             USTAT=2
        END IF SELECT UP
        IF SELECT DOWN KEY IS PRESSED THEN
             BLANK STATE 1 INDICATOR
             USTAT=1
        END IF SELECT DOWN
END STATE 1 PROCESSING

BEGIN STATE 2 PROCESSING (OUTDOOR TEMP)
        SELECT OUTDOOR TEMP
        CONVERT SELECTED DATA TO ENGINEERING UNITS
        TRANSFER DATA TO 3RD AND 2ND LSDS OF NUMERIC DISPLAY
        BLANK LEADING 2 DIGITS OF NUMERIC DISPLAY
        TRANSFER TUNIT TO LSD OF NUMERIC DISPLAY
        ACTIVATE STATE 2 INDICATOR
        IF SELECT UP KEY IS PRESSED THEN
             BLANK STATE 2 INDICATOR
             USTAT=3
        END IF SELECT UP
        IF SELECT DOWN KEY IS PRESSED THEN
             BLANK STATE 2 INDICATOR
             USTAT=2
        END IF SELECT DOWN
END STATE 2 PROCESSING

BEGIN STATE 3 PROCESSING (ENERGY INDEX)
        SELECT ENERGY INDEX
        TRANSFER SELECTED DATA TO 3 LSDS OF NUMERIC DISPLAY
        BLANK LEADING 2 DIGITS OF NUMERIC DISPLAY
        ACTIVATE STATE 3 INDICATOR
        IF SELECT UP KEY IS PRESSED THEN
             BLANK STATE 3 INDICATOR
             USTAT=4
        END IF SELECT UP
        IF SELECT DOWN KEY IS PRESSED THEN
             BLANK STATE 3 INDICATOR
```

```
            USTAT=2
        END IF SELECT DOWN
END STATE 3 PROCESSING
BEGIN STATE 4 PROCESSING (TIME)
        SELECT HOURS
        TRANSFER SELECTED DATA TO MSDS OF NUMERIC DISPLAY
        SELECT MINUTES
        TRANSFER SELECTED DATA TO NEXT 2SDS OF NUMERIC DISPLAY
        IF AMPM=0 THEN
                TRANSFER "A" TO THE LSD OF THE NUMERIC DISPLAY
        ELSE
                TRANSFER "P" TO THE LSD OF THE NUMERIC DISPLAY
        END IF
        ACTIVATE STATE 4 INDICATOR
        TURN ":" ON
        IF PROG =0 (NO PROGRAMMING) THEN
                IF SELECT UP KEY IS PRESSED THEN
                        BLANK STATE 4 INDICATOR
                        TURN ":" OFF
                        STORE 0 TO BDISP
                        USTAT=5
                END IF SELECT UP
                IF SELECT DOWN KEY IS PRESSED THEN
                        BLANK STATE 4 INDICATOR
                        TURN ":" OFF
                        USTAT=3
                END IF SELECT DOWN
                IF PROGRAM KEY IS PRESSED THEN
                        SET BDIGIT TO MSD OF NUMERIC DISPLAY
                        SET BTYPE TO 1
                        SET PROG TO 1
                END IF PROGRAM KEY
           IF PROG=1 THEN
                IF INCREMENT KEY IS PRESSED THEN
                        INCREMENT HOURS
                        IF HOURS > 11 THEN
                                SET HOURS=0
                                COMPLEMENT AMPM
                        END IF
                END IF INCREMENT
                IF DECREMENT KEY IS PRESSED THEN
                        DECREMENT HOURS
                        IF HOURS <0 THEN
                            HOURS=0
                        END IF
                END DECREMENT KEY
                IF ACCEPT KEY IS PRESSED THEN
                        SET BDIGIT TO 3RD LSD OF NUMERIC DISPLAY
                        SET PROG TO 2
                END IF ACCEPT
           END IF PROG=1
           IF PROG=2 THEN
                IF INCREMENT KEY IS PRESSED THEN
                        INCREMENT MINUTES
                        IF MINUTES > 59 THEN
                                SET MINUTES = 59
                        END IF
                END INCREMENT MINUTES
                IF DECREMENT KEY IS PRESSED THEN
                        DECREMENT MINUTES
                        IF MINUTES < 0 THEN
```

```
                    SET MINUTES =0
                END IF
            END IF DECREMENT
            IF ACCEPT KEY IS PRESSED THEN
                SET PROG TO 0
                SET BTYPE TO 0
            END IF ACCEPT
        END IF PROG=2
END STATE 4 PROCESSING TIME
BEGIN STATE 5, PROCESSING (DAY OF WEEK)
      TRANSFER 0 TO ALL DIGITS OF THE NUMERIC DISPLAY
      ACTIVATE STATE 5 INDICATOR
      STORE DWK TO DDISP
      IF PROG = 0
            IF SELECT UP KEY IS PRESSED THEN
                  BLANK STATE 5 INDICATOR
                  STORE SCHED TO BDISP
                  IF PROGRAM MODE IS ON THEN
                        USTATE = 6
                  ELSE
                        USTATE = 0
                  END IF PROGRAM MODE
            END IF
            IF SELECT DOWN KEY IS PRESSED THEN
                  BLANK STATE 5 INDICATOR
                  STORE SCHED TO BDISP
                  USTATE = 5
            END IF SELECT DOWN
            IF PROG KEY IS PRESSED THEN
                  SET BTYPE TO 3
                  SET PROG TO 1
            END IF PROG
      END IF PROG=0
      IF PROG=1 THEN
            IF INCREMENT KEY IS PRESSED THEN
                  INCREMENT DYW
                  IF DYW > 7 THEN
                        DYW = 1
                  END IF DYW
            END IF INCREMENT KEY
            IF DECREMENT KEY IS PRESSED THEN
                  DECREMENT DYW
                  IF DYW < 1 THEN
                        DYW = 1
                  END IF
            END DECREMENT
            IF ACCEPT KEY IS PRESSED THEN
                  SET PROG = 0
                  SET BTYPE = 0
            END IF ACCEPT
      END IF PROG = 1
END STATE 5 PROCESSING
BEGIN STATE 6, PROCESSING (HEATING TEMP SETTINGS)
      SELECT HCOMF
      TRANSFER SELECTED DATA TO MSDS OF NUMERIC DISPLAY
      SELECT HSAV
      TRANSFER SELECTED DATA TO NEXT 2SDS OF NUMERIC DISPLAY
      TRANSFER TUNIT TO LSD OF DISPLAY
      ACTIVATE STATE 6 INDICATOR
      TURN ":" ON
      IF PROG =0 (NO PROGRAMMING) THEN
```

```
            IF SELECT UP KEY IS PRESSED THEN
                 BLANK STATE 6 INDICATOR
                 USTAT=7
            END IF SELECT UP
            IF SELECT DOWN KEY IS PRESSED THEN
                 BLANK STATE 6 INDICATOR
                 TURN ":" OFF
                 STORE 0 TO BDISP
                 USTAT=6
            END IF SELECT DOWN
            IF PROGRAM KEY IS PRESSED THEN
                 SET BDIGIT TO MSD OF NUMERIC DISPLAY
                 SET BTYPE TO 1
                 SET PROG TO 1
            END IF PROGRAM KEY
      IF PROG=1 THEN
            IF INCREMENT KEY IS PRESSED THEN
                 INCREMENT HCOMF
                 IF HCOMF > 40C THEN
                      HCOMF = 40C
                 END IF
            END IF INCREMENT
            IF DECREMENT KEY IS PRESSED THEN
                 DECREMENT HCOMF
                 IF HCOMF < HSAV THEN
                      HCOMF = HSAV
                 END IF
            END DECREMENT KEY
            IF ACCEPT KEY IS PRESSED THEN
                 SET BDIGIT TO 3RD LSD OF NUMERIC DISPLAY
                 SET PROG TO 2
            END IF ACCEPT
      END IF PROG=1
            IF PROG=2 THEN
                 IF INCREMENT KEY IS PRESSED THEN
                      INCREMENT HSAV
                      IF HSAV > HCOMF THEN
                           SET HSAV=HCOMF
                      END IF
                 END INCREMENT MINUTES
                 IF DECREMENT KEY IS PRESSED THEN
                      DECREMENT MINUTES
                      IF HSAV < 10C THEN
                           HSAV=10C
                      END IF
                 END IF DECREMENT
                 IF ACCEPT KEY IS PRESSED THEN
                     SET PROG TO 0
                     SET BTYPE TO 0
                 END IF ACCEPT
            END IF PROG=2
END STATE 6 PROCESSING
BEGIN STATE 7 (COOLING TEMP SETTINGS)
      SELECT CCOMF
      TRANSFER SELECTED DATA TO MSDS OF NUMERIC DISPLAY
      SELECT CSAV
      TRANSFER SELECTED DATA TO NEXT 2SDS OF NUMERIC DISPLAY
      TRANSFER TUNIT TO LSD OF DISPLAY
      ACTIVATE STATE 7 INDICATOR
      IF PROG =0 (NO PROGRAMMING) THEN
            IF SELECT UP KEY IS PRESSED THEN
```

```
            BLANK STATE 7 INDICATOR
            USTAT=8
            STORE SDAY TO DDISP
            STORE SDSCHED TO BDISP
     END IF SELECT UP
     IF SELECT DOWN KEY IS PRESSED THEN
            BLANK STATE 8 INDICATOR
            USTAT=7
     END IF SELECT DOWN
     IF PROGRAM KEY IS PRESSED THEN
            SET BDIGIT TO MSD OF NUMERIC DISPLAY
            SET BTYPE TO 1
            SET PROG TO 1
     END IF PROGRAM KEY
IF PROG=1 THEN
     IF INCREMENT KEY IS PRESSED THEN
         INCREMENT CCOMF
            IF CCOMF > CSAV THEN
                CCOMF = CSAV
            END IF
     END IF INCREMENT
     IF DECREMENT KEY IS PRESSED THEN
            DECREMENT CCOMF
            IF CCOMF < 10 THEN
                CCOMF = 10
            END IF
     END DECREMENT KEY
     IF ACCEPT KEY IS PRESSED THEN
            SET BDIGIT TO 3RD LSD OF NUMERIC DISPLAY
            SET PROG TO 2
     END IF ACCEPT
END IF PROG=1
        IF PROG=2 THEN
            IF INCREMENT KEY IS PRESSED THEN
                INCREMENT CSAV
                IF CSAV > 40 THEN
                    SET CSAV=40
                END IF
            END INCREMENT MINUTES
            IF DECREMENT KEY IS PRESSED THEN
                DECREMENT MINUTES
                IF CSAV < CCOMF THEN
                    HSAV=CCOMF
                END IF
            END IF DECREMENT
            IF ACCEPT KEY IS PRESSED THEN
                SET PROG TO 0
                SET BTYPE TO 0
            END IF ACCEPT
        END IF PROG=2
END STATE 7 PROCESSING
BEGIN STATE 8 PROCESSING (BAR GRAPH PROCESSING)
     IF MODE = 0 (HEATING) THEN
            LOAD HCOMF TO MSDS OF NUMERIC DISPLAY
            LOAD HSAV TO 3RD AND 2ND LSDS OF NUMERIC DISPLAY
        ELSE
            LOAD CCOMF TO MSDS OF NUMERIC DISPLAY
            LOAD CSAV TO 3RD AND 2ND LSDS OF NUMERIC DISPLAY
     TURN ":" ON
     UPDATE SDSCHED FOR SDAY
     STORE SDSCHED IN  BDISP
```

```
TRANSFER TUNITS TO LSD OF NUMERIC DISPLAY
ACTIVATE STATE 8 INDICATOR
IF PROG = 0 THEN
    IF SELECT UP KEY IS PRESSED THEN
        BLANK STATE 8 INDICATOR
        SET USTAT=0
        STORE SCHED TO BDISP
        STORE DWK TO DDISP
    END IF SELECT UP
    IF SELECT DOWN KEY IS PRESSED THEN
        BLANK STATE 8 INDICATOR
        SET USTAT=7
        STORE SCHED TO BDISP
        STORE DWK TO DDISP
    END IF SELECT DOWN
    IF INCREMENT KEY IS PRESSED THEN
        INCREMENT SDAY
        IF SDAY>8 THEN
            SET SDAY =1
        END IF
    END IF INCREMENT KEY
    IF DECREMENT KEY IS PRESSED THEN
        DECREMENT SDAY
        IF SDAY < 0 THEN
            SET SDAY=8
        END IF SDAY
    END IF DECREMENT
    IF PROGRAM KEY IS PRESSED THEN
        SET BTYPE TO 2
        SET PROG TO 1
    END IF PROGRAM KEY IS PRESSED
END IF PROG = 0
IF PROG > 0 THEN
    SET BBIT TO MSD OF TIME TRANS(PROG) * 2
    IF BBIT = 0 OR 4 THEN
        SET BDIGIT TO LSD OF TIME TRANS(PROG)
    ELSE
        SET BDIGIT TO 15-LSD OF TIME TRANS(PROG)
    END IF BBIT
    IF INCREMENT KEY IS PRESSED THEN
        INCREMENT TIME TRANSITION (PROG)
        IF TIME TRANSITION (PROG) > 47 THEN
            TIME TRANSITION (PROG) = 47
        END IF
    END IF INCREMENT KEY
    IF THE DECREMENT KEY IS PRESSED THEN
        DECREMENT TIME TRANSITION (PROG)
        IF TIME TRANSITION (PROG) < 0 THEN
            TIME TRANSITION (PROG) = 0
        END IF
    END IF DECREMENT KEY
    IF INCREMENT OR DECREMENT KEY IS PRESSED THEN
        FOR ALL TIME TRANSITIONS (I) WHERE  1=<I<=3
            IF I < PROG THEN
                IF TIME TRANS (I) > TIME TRANS (PROG) THEN
                    TIME TRANS (I) = TIME TRANS (PROG)
                END IF TIME TRANS
            END IF I < PROG
            IF I > PROG THEN
                IF TIME TRANS(I) < TIME TRANS(PROG) THEN
                    TIME TRANS(I) = TIME TRANS(PROG)
                END IF TIME TRANS
```

```
                END IF I >
            END FOR ALL
        END IF INCREMENT OR DECREMENT
        IF ACCEPT KEY IS PRESSED THEN
            PROG = PROG + 1
            IF PROG > 4 THEN
                PROG = 0
                BTYPE = 0
            END IF
        END IF ACCEPT
    END IF PROG > 0
END STATE 8 PROCESSING
BEGIN CONVERT SELECTL DATA TO ENGINEERING UNITS
    MULTIPLY SELECTED DATA BY CCONST
    DIVIDE RESULT BY 100 (DROP 2 LEAST SIGNIFICANT DIGITS)
    ADD COFFSET
END CONVERT SELECTED DATA
BEGIN CARRY OUT BLINK PROCESSING
    IF BFLAG=1 THEN
        IF BTYPE=1 THEN
            STORE 0 INTO BDIGIT AND BDIGIT+1 OF FILE 1
        END IF BTYPE=1
        IF BTYPE=2 THEN
            SET BIT BBIT OF DIGIT BDIGIT IN FILE 0 TO 0
        END IF BTYPE=2
        IF BTYPE=3 THEN
            STORE 0 INTO FILE 0 DIGITS 12 AND 13
        END IF BTYPE=3
END CARRY OUT BLINK PROCESSING
```

7.3 Interrupt program.

```
BEGIN INTERRUPT PROGRAM
    READ KEYPAD
    INCREMENT THE TIME
    BLINK THE DISPLAY
END INTERRUPT ROUTINE

BEGIN READ THE KEYPAD
    FOR ALL INPUTS D0-D5
        IF THE INPUT = 0 THEN
            STORE PAD NUMBER IN PADNO
        END IF
    CLEAR TTIMER
    END FOR ALL
END READ KEYPAD

BEGIN INCREMENT THE TIME
    INCREMENT TICKS
    IF TICKS = 1 AND SECS = 58 THEN
        TURN TEMPERATURE TIMER ON
    END IF
    IF TICKS = 2 AND SECS = 58 THEN
        READ INSIDE TEMP
    END IF
    IF TICKS = 3 AND SECS = 58 THEN
        READ  OUTSIDE TMEP
    END IF
    IF TICKS = 4 THEN
        SET TICKS =0
```

```
        INCREMENT SECS
        IF SECS = 60 THEN
            SET SECS = 0
            INCREMENT MINUTES
            INCREMENT TTIMER
            IF TTIMER >3 THEN
                TTIMER = 3
            END IF TTIMER
            IF MINUTES = 30 THEN
                INCREMENT HHOUR
            END IF
            IF MINUTES = 60 THEN
                SET MINUTES = 0
                INCREMENT HHOUR
                IF HHOUR > 47 THEN
                    SET HHOUR = 0
                END IF
                INCREMENT HOUR
                IF HOUR = 24 THEN
                    HOUR = 0
                    INCREMENT DWK
                    IF DWK = 8 THEN
                        DWK = 1
                        END IF DWK
                END IF HOUR
            END IF MINUTE
        END IF SECS
    END IF TICKS
END INCREMENT THE TIME

BEGIN PROCESSING THE BLINK FLAG
    COMPLEMENT BFLAG
END PROCESSING THE BLINK FLAG

BEGIN READ INSIDE TEMP
    PTEMP = TEMP INPUT
    WHILE PTEMP = TEMP INPUT
        READ TEMP INPUT
    END WHILE
    PTEMP = TEMP INPUT
    WHILE PTEMP = TEMP INPUT
        READ TEMP INPUT
        INCREMENT IDTEMP
    END WHILE
END READ INSIDE TEMP

BEGIN READ OUTSIDE TEMP
    PTEMP = TEMP INPUT
    WHILE PTEMP = TEMP INPUT
        READ TEMP INPUT
    END WHILE
    PTEMP = TEMP INPUT
    WHILE PTEMP = TEMP INPUT
        READ TEMP INPUT
        INCREMENT ODTEMP
    END WHILE
END READ OUTSIDE TEMP
```

1. A diagnostic thermostat for a building employing a single-zone heating system, comprising:
   first means for sensing indoor temperature,
   second means for sensing outdoor temperature,
   third means for cycling a furnace on and off in response to the level of the indoor temperature,
   fourth means for measuring time,
   fifth means for setting a desired indoor temperature,
   microprocessor means for determining, on the basis of signals from the first, second, third and fourth means, the heating performance of the building over a given period of time, and
   sixth means for displaying said heating performance expressed as a function of BTUs per degree day.

2. The invention claimed in claim 1, in which the heating performance is expressed as BTUs per degree day.

3. The invention claimed in claim 1, which further comprises seventh means for setting back the desired indoor temperature over a portion of each day.

4. The invention claimed in claim 3, which further comprises eighth means for electronically inputting the furnace rating, the setback time and duration and the setback temperature, the fifth means for setting a desired indoor temperature being part of the eighth means and being done electronically.

5. The invention claimed in claim 1, in which said microprocessor means makes its determinations only when the outdoor temperature is below a predetermined level.

6. The invention claimed in claim 1, in which said given period of time is at least two weeks.

7. The invention claimed in claim 6, in which said given period of time is at least two weeks.

8. The invention claimed in claim 1, further comprising an apertured door which masks certain parts of the display and certain controlling inputs when closed, thus simplifying use of the thermostat by untrained persons.

9. A method of diagnosing the heating performance of a building which includes a furnace and employs a single-zone heating system, comprising the steps:
   (a) sensing indoor temperature and providing a first signal based thereon,
   (b) sensing outdoor temperature and providing a second signal based thereon,
   (c) cycling the furnace on and off in response to the level of the indoor temperature as compared to a desired indoor temperature,
   (d) measuring time, and
   (e) on the basis of said time measurement, said first and second signals and the on and off signals, determining electronically the heating performance of the building over a given period of time expressed as a function of BTUs per degree day.

10. The method claimed in claim 9, in which the heating performance is expressed as BTUs per degree day.

11. The method claimed in claim 9, which comprises the further step of setting back the desired indoor temperature over a portion of each day.

12. The method claimed in claim 9, in which step (e) is carried out only when the outdoor temperature is below a predetermined level.

13. The method claimed in claim 9, in which said given period of time is at least two weeks.

14. The method claimed in claim 13, in which step (e) is carried out only when the outdoor temperature is below a predetermined level.

* * * * *